United States Patent [19]

Fukushima et al.

[11] Patent Number: 4,972,269
[45] Date of Patent: Nov. 20, 1990

[54] ELECTRONIC IMAGING APPARATUS WITH SIGNAL INTEGRATION AND SELECTIVE IMAGE RECEIVING MODES

[75] Inventors: Nobuo Fukushima, Kanagawa; Shigeo Ogura, Tokyo; Nobuo Tezuka, Kanagawa; Ryosuke Miyamoto, Kanagawa; Shinji Sakai, Kanagawa, all of Japan

[73] Assignee: Canon Kabushiki Kaisha, Tokyo, Japan

[21] Appl. No.: 376,351

[22] Filed: Jul. 6, 1989

Related U.S. Application Data

[63] Continuation of Ser. No. 115,248, Oct. 29, 1987, abandoned.

[30] Foreign Application Priority Data

Oct. 31, 1986 [JP] Japan .................................. 61-261145
Nov. 7, 1986 [JP] Japan .................................. 61-265893
Nov. 7, 1986 [JP] Japan .................................. 61-265894

[51] Int. Cl.$^5$ .......................................... H04N 5/238
[52] U.S. Cl. ............................... 358/228; 358/213.13; 358/213.19
[58] Field of Search .............. 358/228, 227, 213.19, 358/213.13; 250/578

[56] References Cited

U.S. PATENT DOCUMENTS

| | | | |
|---|---|---|---|
| 4,523,101 | 6/1985 | Tsunekawa | 250/578 |
| 4,535,364 | 8/1985 | Hirobe | 358/228 |
| 4,668,991 | 5/1987 | Theuwissen et al. | 358/227 |
| 4,689,686 | 8/1987 | Hashimoto et al. | 358/213.19 |
| 4,689,889 | 8/1987 | Saito et al. | 358/228 |
| 4,734,777 | 3/1988 | Okino et al. | 358/213.19 |

Primary Examiner—Stephen Brinich
Attorney, Agent, or Firm—Robin, Blecker, Daley & Driscoll

[57] ABSTRACT

An electronic imaging apparatus in which an exposure is controlled by using that output of an image pickup element which is obtained with exposure adjusting means in a corresponding position to the output of a photosensitive element solely used for light measurement, being characterized by including a control circuit for changing the reading-out speed over between a prescribed portion of the image sensing area to be used for the exposure control and the other portion than that prescribed portion, wherein the size and location of the aforesaid prescribed portion is made changeable by an adjusting member accessible from the outside of the apparatus.

19 Claims, 13 Drawing Sheets

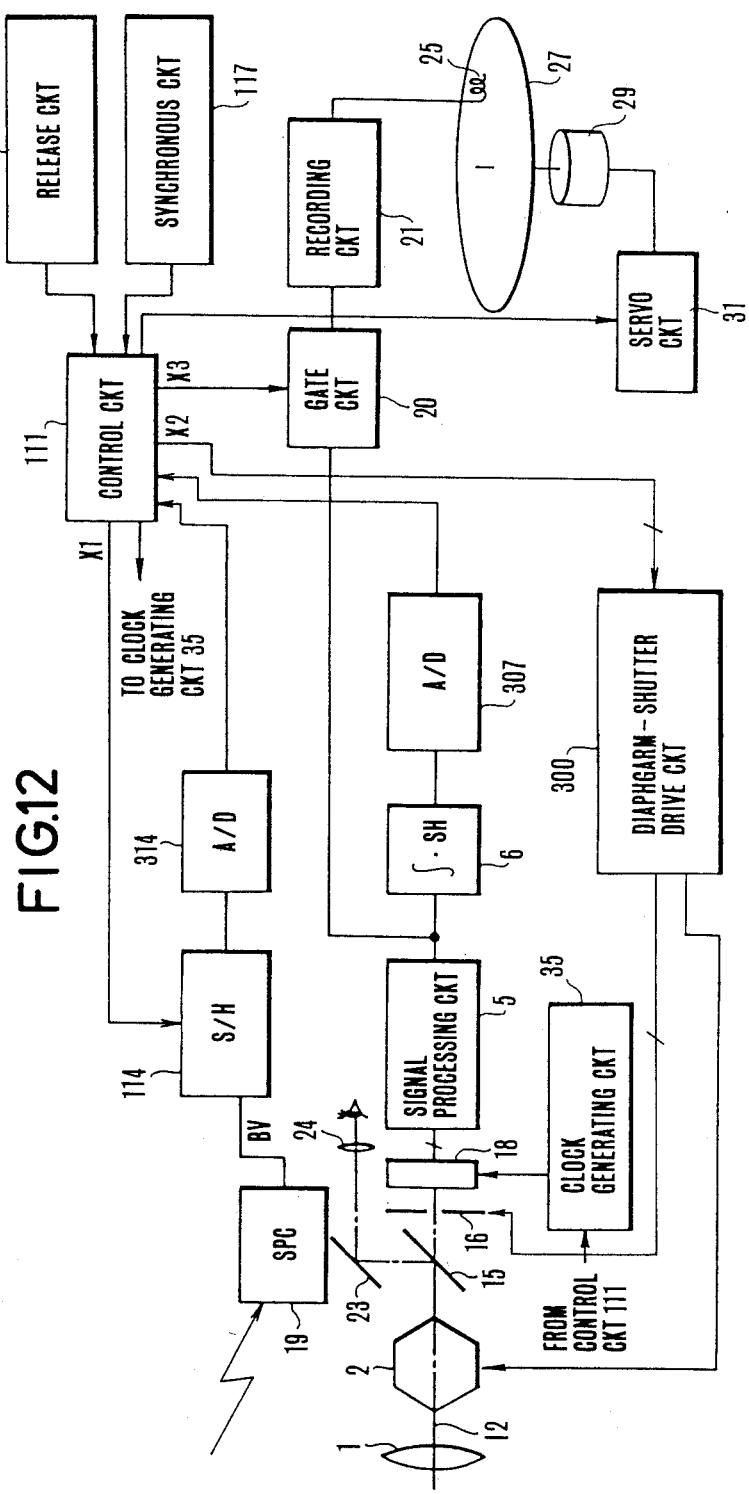

ELECTRONIC IMAGING APPARATUS WITH SIGNAL INTEGRATION AND SELECTIVE IMAGE RECEIVING MODES

This application is a continuation of application Ser. No. 115,248 filed Oct. 29, 1987 now abandoned.

BACKGROUND OF THE INVENTION

1. Field of the Invention

This invention relates to electronic imaging apparatus and, more particularly, to electronic imaging apparatus in which exposure is controlled in accordance with the output of an image pickup element, and a drive device for the image pickup element.

2. Description of the Related Art

The conventional electronic imaging apparatuses have employed either one of the two exposure control methods of which the first is to derive the light value not from the image pickup element but from another element solely used therefor, and the second is by utilizing the output of the image pickup element. In the first method, because the image pickup and light metering elements have different characteristics from each other and because the light arrangements to both elements are different from each other, an error occurs. Hence there was a problem that a high accuracy of exposure control could not be assured.

In the second method also, because the image pickup elements generally have a narrow dynamic range of operation, a problem arose that, for example, when a servo intervened between in that element and the exposure control means, the time until the exposure control is complete became very long.

To overcome these problems, attempts have been made to use both of the aforesaid first and second methods, as, for example, disclosed in Japanese Laid-Open Patent Application No. Sho 59-194574.

At this level of technique, however, though the exposure control time becomes shorter than in the second method, there is many a photographic situation where much shorter a time is required.

Also, in landscape photography, for example, with a person ordinarily framed when in shooting, because the output of the image pickup element included a large proportion of the light amount from, for example, the bright sky or the like in the background, the derived light value was dim for the person and an under-exposure resulted over the entire area of the frame.

Such a problem was commonly encountered even in the imaging apparatus where the output of the image pickup element was processed for purposes other than the light metering one.

SUMMARY OF THE INVENTION

An object of the present invention, is to provide an electronic imaging apparatus capable of greatly shortening the duration of exposure control.

Another object is to provide a driving device for the image pickup element having a capability that enables such an object to be achieved.

With the last-named problem in mind, still another object of the invention is to provide a novel method for shuttering the image pickup element.

To achieve the above-described objects, in an embodiment of the invention applied to the electronic imaging apparatus in which the size of opening of the diaphragm aperture is adjusted in accordance with the output of an element solely used for light metering, and the output of the image pickup element at the thus-adjusted aperture is then used to derive an exposure value, the driving device for the image pickup element is provided with control means for causing the speed at which that prescribed part of the image sensing surface which is used for exposure control is read out to differ from that at which the other part is read out.

Since, according to such a feature, the other part than that used for exposure control is read out at a higher speed, the exposure control can be carried out at a far higher speed than was heretofore possible, and the accuracy of exposure control is much improved.

In another embodiment of the invention, the image pickup element is provided with means for reading out signals therefrom, first means for differentiating the speed at which electrical readout is obtained from the prescribed light metering area in the image sensing surface from that for the other area, and second means for changing the size and location of the light metering area by a command from outside of the apparatus.

Therefore, an advantage is produced in that the apparatus can be adapted to a wider range of photographic situations.

To achieve an improvement of this capability, in still another embodiment, the electronic imaging apparatus having an image pickup element is provided with shuttering means having a first stopped position where the entire area of the image sensing surface of the image pickup element is shut off from light, and a second stopped position where the image sensing surface is blocked only in part.

By using that output of the image pickup element which is produced when the shuttering means stops in the second position for deriving the light value, it is made possible to prevent, for example, the sky or like bright background from unduly largely influencing the exposure determination.

In a further embodiment, the electronic imaging apparatus having an image pickup element and a shutter, operating between a first position where the image sensing surface of the image pickup element is blocked only in part, and a second position where it is entirely shut off from light, is provided with control means for transferring the signal generated in the light struck part of the surface to the light-blocked part, thereby giving an additional advantage in that the signal representing the object brightness sensed with an improved accuracy is prevented from suffering deterioration which would result when the signal generated in the light metering area is not transferred to and stored in the light-blocked area.

Other objects and features of the invention will become apparent from the following description of embodiments thereof by reference to the drawings.

BRIEF DESCRIPTION OF THE DRAWINGS

FIG. 12 is a schematic view, partly in block form, of the circuitry of another embodiment of the electronic imaging apparatus according to the invention.

DETAILED DESCRIPTION OF THE PREFERRED EMBODIMENTS

The present invention next is described in detail in connection with embodiments thereof by using the drawings.

Figure 1:
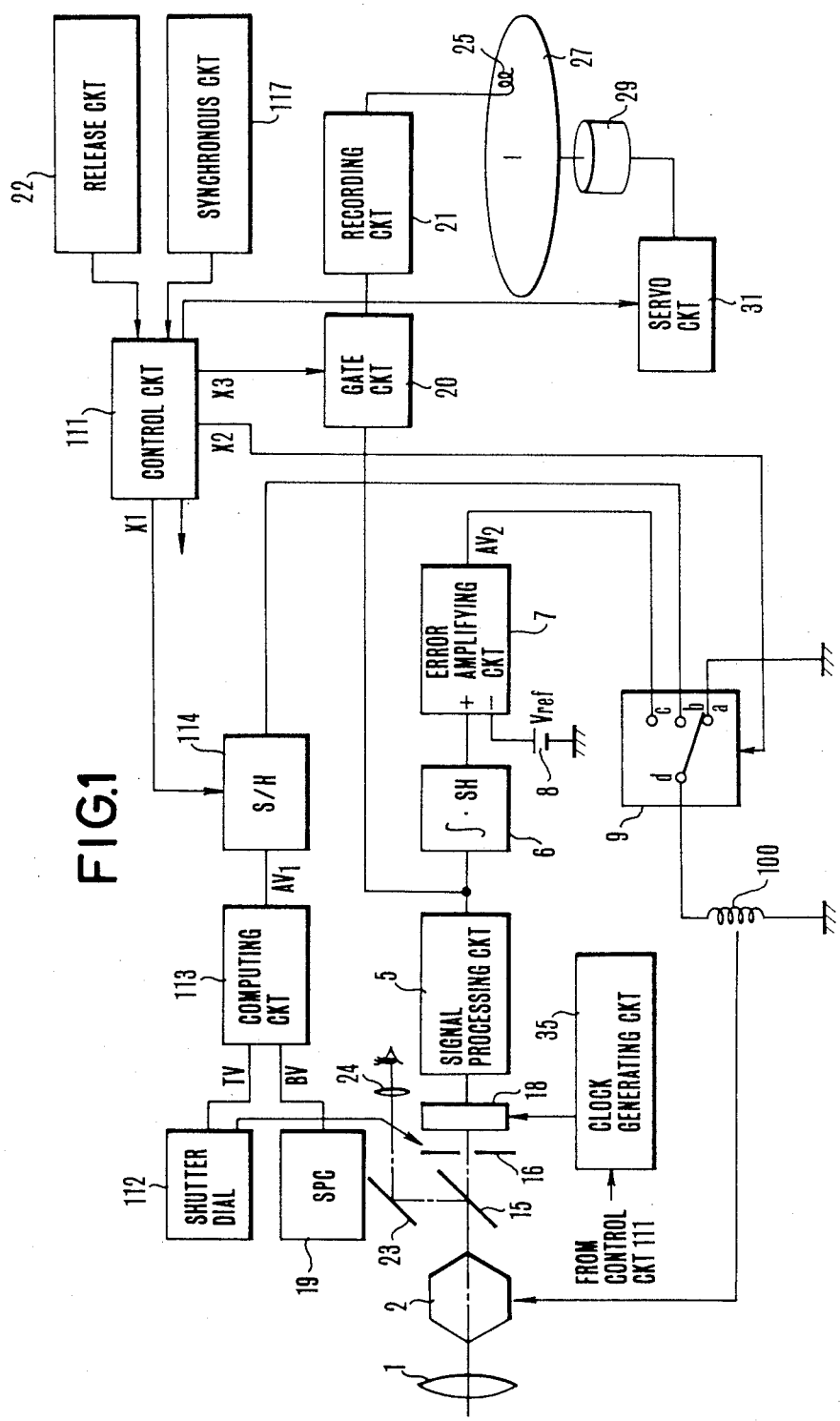
FIG. 1 is a block diagram of an embodiment of an electronic imaging apparatus according to the invention.
Figure 2:
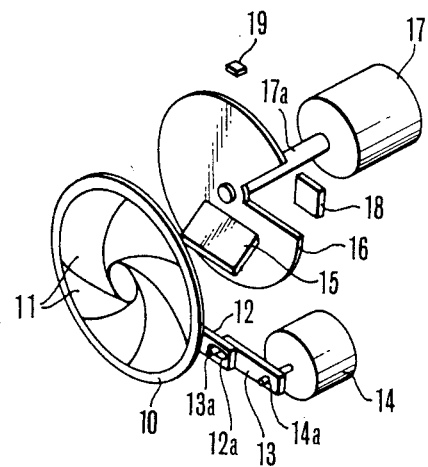
FIG. 2 is an exploded perspective view of the exposure control mechanism of FIG. 1.

In FIGS. 1 and 2 there is shown one embodiment of the invention. Before an explanation of the electrical circuit of the electronic imaging apparatus, its optical system is first described with reference to FIG. 2. In FIG. 2, a control ring 10 for diaphragm blades 11 has a radial extension 12 with a long slot 12a formed therein. A drive connection or lever 13 has a pin 13a at one end thereof which engages in the slot 12a, and is fixedly mounted at the other end on the output shaft 14a of a diaphragm drive motor 14. 15 is a half-mirror. A shutter disc 16 is fixedly mounted on the output shaft 17a of a shutter drive motor 17. An image pickup element 18 is in the form of a CCD of the frame or inter-line transfer type, an image pickup tube, or a MOS image sensor. A light metering means has a photosensitive element 19 such as SPC or CdS having excellent response characteristics, particularly in respect to readout.

Motion of the diaphragm drive motor 14 is transmitted through the lever 13, the pin 13a, the slot 12a and the extension 12 to rotate the control ring 10. By the rotation of the ring 10, the diaphragm blades 11 are pivotally moved to vary the size of opening of an aperture. Light from an object to be photographed after having passed through the diaphragm aperture is split by the half-mirror 15, a portion of which is directed to the photosensitive element 19, the other portion after having passed through the opened shutter being focused to form an object image on the CCD 18. The operation of the shutter is controlled in such a manner as will be described later in connection with FIG. 5, so that during the transferring operation the CCD 18 is hindered from being exposed to the light from the object. Thus, smear is prevented from occurring.

An example of a circuit suited to control such a mechanism is shown in FIG. 1, where the same reference characters have been employed to denote the similar parts to those shown in FIG. 2. A photographic lens 1 is positioned in front of a diaphragm 2 comprised of the ring 10, blades 11 shown in FIG. 2 and others. The output signal of the CCD 18 is processed to form luminance and chrominance information which is then subjected to various corrections in a signal processing circuit 5. The luminance signal of appropriate form for integration from the circuit 5 is then sampled and held in each field by an integration circuit 6. The driving device for the CCD 18 is in the form of a clock generating circuit 35. An error amplifying circuit 7 compares the output of the integration circuit 6 with a prescribed potential from a reference voltage source 8 to produce an error signal which is then applied to a switching circuit 9. The switching circuit 9 has a common movable contact, d, and three throws, a to c. Depending on the level of a control output $X_2$ from a control circuit 111, the movable contact, d, is connected to one of the throws. A diaphragm drive coil 100 is connected to this common contact, d, closing down the diaphragm 2 as the voltage applied on the common contact, d, increases. For note, when no current flows to the coil 100, the diaphragm 2 is set to a full open aperture.

A shutter dial or the like cooperates with a time presetting circuit 112 to specify the angle of opening in the rotary shutter 16, i.e., a desired value of shutter time Tv. This shutter time Tv is computed by a computing circuit 113 with the output of the light metering element 19 or the brightness information Bv to form preliminary aperture information $AV_1$. The output $AV_1$ of the computing circuit 113 is sampled in timing relation with the control output $X_1$ of the control circuit 111, and the sampled output is stored in a sample-hold circuit 114 as the memory means. 20 is a gate circuit, and 21 is a recording circuit. The opening period of the gate circuit 20 and its timing are controlled by a control output $X_3$ of the control circuit 111.

Figure 5:
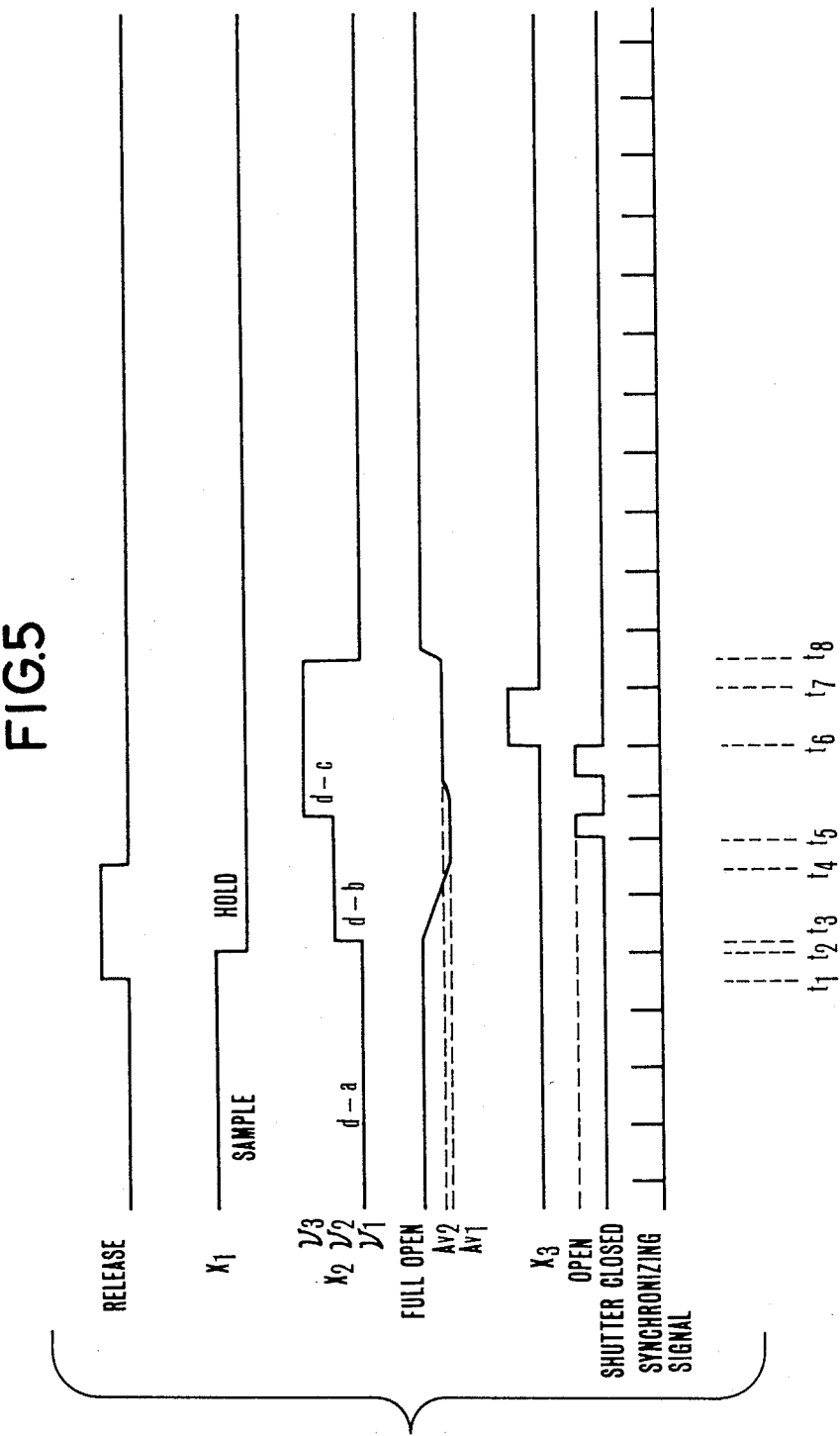
FIG. 5 is a pulse timing chart illustrating a manner in which the apparatus of FIG. 1 operates.

The control circuit 111 receives the output of a release circuit 22 for forming a release signal and the output of a synchronous circuit 117 for forming a synchronizing signal and produces the control outputs $X_1$-$X_3$ as shown in FIG. 5. For note, this example of the apparatus has another half-mirror 23 for splitting off a portion of the reflected light from the first half-mirror 15 to a finder optical system 24.

Figure 3:
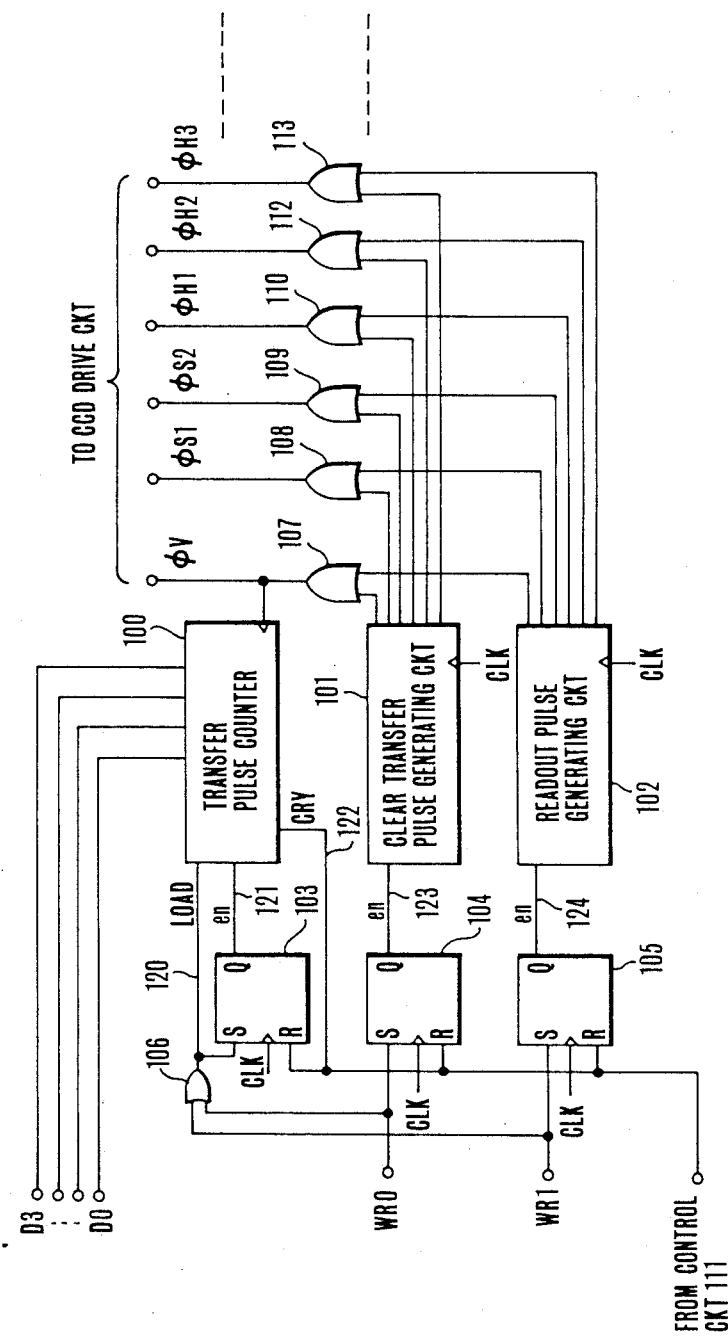
FIG. 3 is an electrical circuit diagram, partly in block form, illustrating the details of the driving device 35 of FIG. 1.

Referring next to FIG. 3, the clock generating circuit 35 includes a counter 100 for counting the number of pulses produced from an OR gate 107. A value of data buses $D_0$ to $D_3$ is loaded on the counter 110 in response to a LOAD pulse 120 produced from the output of an OR gate 106. With this value taken as the initial one, the counter 100 performs counting when the "enable" signal 121 produced at the output Q of an RS-flip-flop (RS-FF) 103 is high level. That is, the counter 100 is an "UP" counter. When the full count is reached, a carry signal 122 is produced. This counter has a capacity large enough to count the total number of picture elements in the vertical direction of the CCD 18. That is, in this embodiment, the CCD 18 has 250 lines of picture elements, and the counter 100 produces the carry signal when it has counted 250 pulses. A clear transfer pulse generating circuit 101 produces timing signals for transferring the charges accumulated on the CCD 18 in the vertical direction to clear the CCD 18. The transfer pulses are produced when the "enable" signal 123 produced from an RS-FF 104 is high level.

102 is a readout pulse generating circuit for producing timing signals for reading out the charges accumulated on the CCD. The transfer pulses are produced when the "enable" signal 124 produced from an RS-FF 105 is high level.

Figure 4:
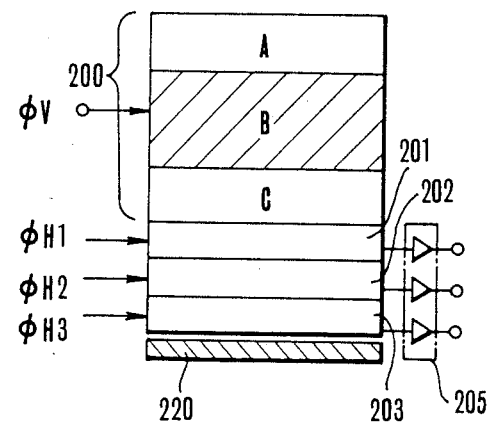
FIG. 4 is a plan view of the image pickup element or CCD 18 of FIG. 1.

An example of the structure of the CCD 18 used in this embodiment is explained by using FIG. 4.

In FIG. 4, 200 denotes an entire image sensing area provided with three primary color or R, G and B stripe filters. In this image sensing area 200, the impinging light is converted to proportional electrical charge, and this charge is accumulated in each picture element. 201 to 203 are horizontal transfer registers for reading out video signals transferred from the image sensing area 200. For note, in this embodiment, the CCD 18 receives light rays when the shutter 16 fully opens. Then, after the shutter 16 is closed, the charges are transferred horizontal line-by-line to the horizontal transfer registers 201-203, wherein the accumulated charges by those picture elements which receive the impinging light through the R, G and B stripe filters are transferred respectively to the register 201, 202 and 203, as their bias voltages are selectively changed by pulses $\phi_{S1}$ and $_{S2}$ shown in FIG. 3. The concrete method for this transfer may be that disclosed, for example, in U.S. Pat. No. 4,513,313.

A drain 220 is so arranged that the charges left in the horizontal transfer registers 201-203 overflow thereto, as they were not transferred when the circuit 101 was producing the transfer pulses.

For note, the above-described transfer pulses to be supplied to the image sensing area 200 and horizontal transfer registers 201-203 are indicated at $\phi_V$, $\phi_{H1}$-$\phi_{H3}$, and $\phi_{S1}$, $\phi_{S2}$ in FIG. 3.

Also, the circuit for generating these pulses themselves is possible to form by combining a number of counters as is well known in the art.

The RS-FF 103 is set when the output of the OR gate 106 is high level, and reset when the carry signal 122 of the counter 100 rises. The RS-FFs 104 and 105 are set when the outputs $WR_0$ and $WR_1$ of the control circuit 111 are high level respectively, and reset when the carry signal 122 rises. 107-113 are OR gates receptive of pulses of different timing in the logical sum from the clear transfer pulse generating circuit 101 and the read-out pulse generating circuit 102 for producing the transfer pulses at their outputs that are connected to the CCD 18 as has been described above.

The operation of the apparatus of such construction is described on the basis of the timing chart of FIG. 5.

After a power switch (not shown) has been thrown, at a time $t_1$ when a release button (not shown) is pushed down, the release circuit 22 produces a pulse of prescribed duration.

Soon after this, at a time $t_2$, the output $X_1$ of the control circuit 111 changes to low level in synchronism with the output of the synchronous circuit 117 to hold the aperture value $Av_1$ computed from the output Bv of the SPC 19 and the preset value of shutter time Tv.

For note, up to this stage, the control output $X_1$ has remained at the lowest level $v_1$ for which the diaphragm has been fully opened. Therefore, the finder is so bright as to permit focus adjustment and determination of a desired composition to be carried out quickly and easily.

At a time $t_3$ just after the aperture value $Av_1$ has been held, the control output $X_2$ produced from the control circuit 111 then rises to the level $v_2$ as shown in FIG. 5, thereby the contacts, b and d, of the switch 9 are brought into connection. Hence, the diaphragm 2 is closed down from the full open position to a position for the aperture value $Av_1$. At a time $t_5$ when a prescribed longer time than necessary to move the diaphragm 2 from the maximum to the minimum aperture position has then elapsed, the shutter is opened for a prescribed period. From the time of its closure onward, the image signal formed during the time when the shutter was opened is read out at a high speed. In accompaniment with this readout, the control output $X_2$ produced from the control circuit 111 increases to the level $v_3$ as shown in FIG. 5. Therefore, the switch 9 moves to its "c" position where the output $Av_2$ of the error amplifying circuit 7 is fed back to control the size of opening of the diaphragm 2 in accordance with the output of the light metering area in the CCD 18. Then, the shutter is opened again for the preset exposure time.

At this stage, therefore, the exposure by the diaphragm and shutter can be adjusted with a high accuracy in accordance with the light value. Moreover, the ramping is very fast. Hence, good shutter chances will not be missed. That is, for the feedback control of the diaphragm 2 by the output $Av_2$ of the error amplifying circuit 7 from the time $t_5$, because it is before this time that the aperture size has already reached a value nearly equal to the target value by the output of the SPC 19, the fine adjustment of the aperture size is completed in a very short time. After that, the control output $X_3$ is changed to high level in synchronism with the synchronizing signal and maintained at this level for the period of one frame. The read-out output from the CCD 18 passes through the gate circuit 20 to the recording circuit 21, and, therefrom, is directed to a head 25 by which it is recorded.

As the diaphragm 2 is driven by feedback during the period from the time $t_5$ to the time $t_6$, it is in this embodiment that the driving speed of the CCD 18 is sped up in this period compared with the other events. Therefore, the feedback control can be carried out at a faster speed than was heretofore possible. Instead of applying the feedback control to the diaphragm, the actual shutter time may be corrected from the preset value during the period from the time $t_5$ to the time $t_6$.

After the recording is completed, the control output $X_2$ drops to the level $v_1$ at a time $t_8$, resetting the diaphragm 2 to the full open aperture. So, the finder becomes brightest again.

Figure 6:
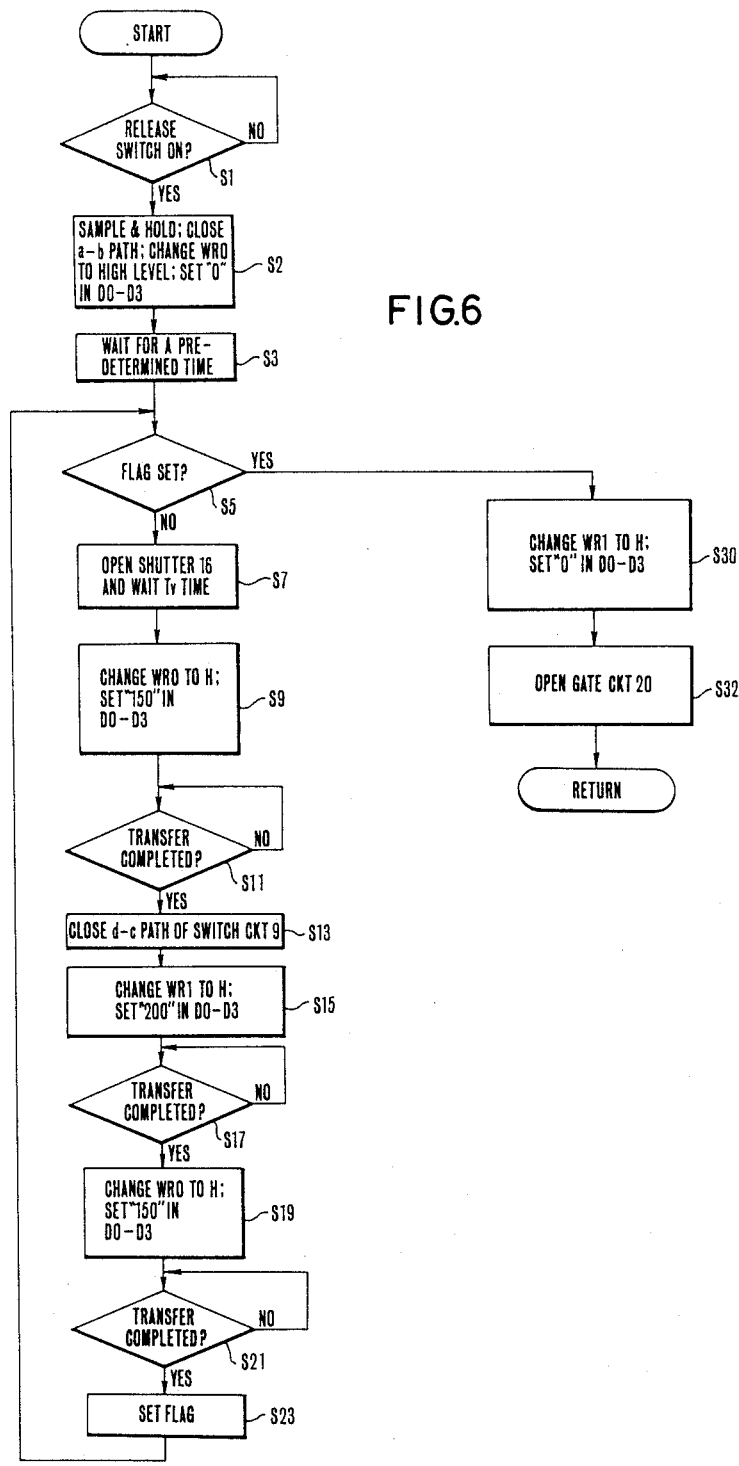
FIG. 6 is a flowchart for the sequence of operations of the control circuit 111 of FIG. 1.

How to control the reading out from the CCD 18 in the aforesaid period from the time $t_5$ to the time $t_6$ is next described by reference to FIG. 6.

First explanation is given to the sequence of operations beginning with the closure of a release switch (not shown) and terminating at the time $t_5$.

When the release switch turns on, the release circuit 22 produces the release signal. The flow then advances from a step S1 to the next step S2 where in synchronism with the vertical synchronizing signal of the synchronous circuit 117, the sampling and holding is carried out by the sample-hold circuit 114 and the d-b path of the switch circuit 9 is closed. A predetermined time is then waited until the movement of the diaphragm 2 by the output of the sample-hold circuit 114 is complete (step S3). For note, in the step S2, the potential at the terminal $WR_0$ is changed to high level, and "0" is set in the terminals D0–D3 so that "0" is loaded into the transfer pulse counter 100 and the RS-FFs 103 and 104 are set. Therefore, by the clear transfer pulse generating circuit 101, the aforesaid pulses such as $vv$ are produced to clear the CCD 18. When the clearing is complete, the RS-FFs 103 to 105 are reset.

Following the step S2, whether or not a flag to be described later is set is tested (step S5). If the flag is not set, then the shutter 16 is opened in the timing indicated at t$_5$ and maintained open for the preset time Tv (step S7).

Subsequently, the control circuit 111 changes its output at the terminal WR$_0$ to high level, and "150" is set in the terminals D0–D3 (step S9).

Therefore, the signal of high level is applied to the input terminal S of the RS-FF 104, and the data of "150" from the data bus D0–D3 is loaded into the transfer pulse counter 100.

Responsive to the next clock signal, as it sets the RS-FF 104, the clear transfer pulse generating circuit 101 starts to operate, producing the aforesaid pulse $\phi v$ and others. During this time, a high speed vertical transferring takes place. When the pulse $\phi v$ reaches 100 in number, the content of the transfer pulse counter 100 becomes "250", and the carry signal is produced therefrom.

Responsive to this carry signal, the RS-FFs 104 and 105 are reset, stopping the production of transfer pulses for a while. Then, as the control circuit 111 takes such a carry signal as the completion of the transferring operation, the flow advances from a step S11 to the next step S13. In the step S13, the control circuit 111 controls the switch circuit 9 so that its d-c path is closed, and then changes the output at the terminal WR$_1$ to high level, and "200" is set in the data bus D0–D3 (step S15).

Therefore, the signal of high level is applied to the input terminal S of the RS-FF 105 and the data of "200" from the data bus D0–D3 is loaded into the transfer pulse counter 100.

Responsive to the next clock signal, as it sets the RS-FF 105, the readout pulse generating circuit 102 starts to operate, producing the aforesaid pulse $\phi v$ and others. The pulses produced from this circuit 102 are the normal ones. Hence the signal of the image sensing area 200 is read out at the normal speed from the horizontal transfer registers 201–203, and the read-out signal is, as has been described above, integrated by the integration circuit 6 of FIG. 1, then amplified by the error amplifying circuit 7, and then used in controlling the current flowing to the coil 100. Thus, the aperture size of the diaphragm 2 is finely adjusted. For note, since, in this case, at the steps S9 and S11, 100 lines of the video signal are abandoned into the drain 220, it results that the remaining 50 lines of the video signal which correspond to the central portion of the area of the picture frame are used for such adjustment.

At a time when the 50th pulse $\phi v$ arrives at the transfer pulse counter 100, its content reaches "250". Therefore, this counter 110 produces another carry signal. Upon detection of this carry signal as the termination of the reading-out operation, the flow advances from a step S17 to a step S19.

The steps S19, S21 are similar to the steps S9, S11 described before. Their explanation is omitted here.

In such a manner, the driving device for the image sensing area 200 operates. When all electrical charges have been transferred, the flag is set in a step S23 to return the flow to the step S5. Then, the flow is branched from the step S5 to a step S30.

In the step S30, the potential at the terminal WR$_1$ is changed to high level, and "0" is set in the data bus D0–D3. Then, similarly to what has been described in connection with the step S15, the readout pulse generating circuit 102 starts to operate. So, the normal reading-out of the image sensing area 200 is started, the gate circuit 20 is opened, and recording of video signals for one frame is carried out by the recording circuit 21.

As has been described above, in this embodiment, light metering is operated in such a manner that the output of SPC 19 is first used to roughly adjust the aperture size of the diaphragm 2 to a preliminary setting and then the shutter is opened for the prescribed time to use the information about the object brightness from the central portion of the area of the picture frame for finely adjusting the aperture size, wherein those signals which come from the other or upper and lower portions of the area of the picture frame are read out at the increased speed and abandoned. Therefore, it is made possible to carry out the control very accurately so that the output of the image pickup element becomes constant. Further, the time lag from the production of the release signal from the release circuit 22 to the start of actual recording of a picture can be much shortened.

Also, the clock generating circuit 35 of the invention has another feature in that for the pulses produced from the clear pulse generating circuit 101 and the pulses produced from the readout pulse generating circuit 102, when counting the number of pulses in either train, the same counter, 100 is used. This enables the structure to be much simplified.

Also, in constructing the clock generating circuit 35, the counter 100 is made presettable and accessible from the outside thereof. This feature of the invention allows for any other desired portion of the image sensing area than the central one of the image sensing area of the image pickup element to be read out in a very short time for the exposure control purpose, and its size to be manually varied as desired. Thus, such a clock generating circuit 35 can serve to control the exposure even in the evaluative light-metering mode, for example.

Though, in this embodiment, the up counter has been used as the counter for counting the transfer pulses, a down counter may be used in place of it, of course. For this case, the number of pulses to be transferred for the exposure control purpose can be taken at any desired or preset valve.

As has been described above, according to the invention, in the embodiment thereof applied to the electronic imaging apparatus of the type in which the exposure is controlled by using that output of the image pickup element which is formed under the condition that the exposure determining means has previously been set to suit the output of the element solely used for light metering, the speed at which that portion of the image sensing area of the image pickup element which is previously determined to be used for exposure control is read out is made different from that for the other portion, thereby giving great advantages, for example, that of achieving a great reduction of the time lag from the actuation of a camera release to the initiation of an exposure for recording purposes.

Another example of application of the invention is that, due to its capability of sampling the signal from an arbitrarily selected portion of the image sensing area of the image pickup element at a desired speed, the driving device for the image pickup element can be used for a wide variety of selectively operated light metering modes.

A second embodiment of the invention is described by reference to FIGS. 7 and 8.

First explanation is given to the mechanical features of the second embodiment.

Figure 7:
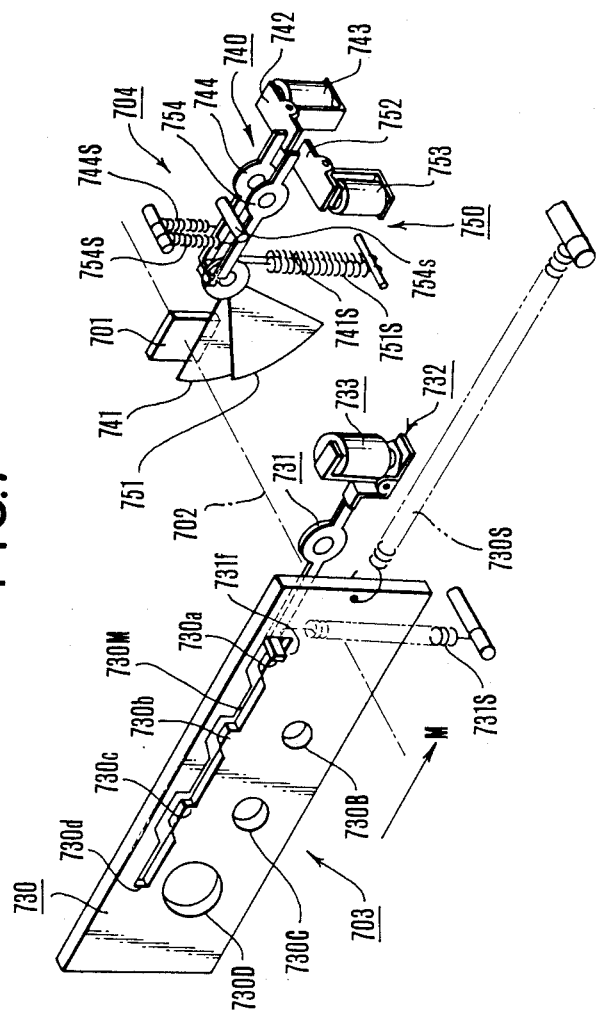
FIG. 7 is a perspective view of a diaphragm and a shutter employed in a second embodiment of the invention.
Figure 8:
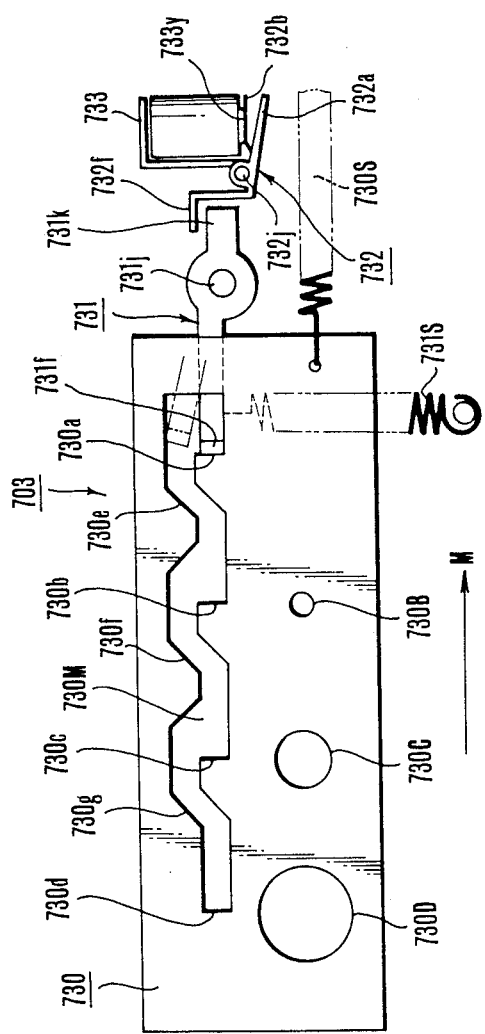
FIG. 8 is a front elevational view of the diaphragm of FIG. 7.

FIGS. 7 and 8 are perspective and elevational views of a diaphragm device and a shutter device used in the second embodiment. In FIGS. 7 and 8, 701 is an image pickup element or CCD; 702 is an optical axis; 703 is the diaphragm device; and 704 is the shutter device. The same figures represent the initial position before exposure. That is, a light bundle along the optical axis 702 to impinge on the image pickup element 701 is blocked by a diaphragm plate 730, and about 30% of the image sensing area from the lower side of the frame is shielded by part of a leading shutter blade 741 which constitutes a focal plane shutter together with a trailing blade 751.

The rectangular diaphragm plate 730 has a longitudinal slot 730M cut off in the upper margin thereof. Formed in the upper and lower side edges of the slot 730M are three abutments 730a–730c and three slant guides 730e–730g respectively. Also, in the lower half of of the diaphragm plate 730 there are three apertures 730B–730C of different sizes with their centers on a common line parallel to the slot 730M in the corresponding positions to the abutments 730b–730c and the terminal end 730d of the slot 730M. A drive coil spring 730S whose one end is connected to the right side of the diaphragm plate 730 urges it to move rightward (in a direction indicated by arrow M). Motion of the diaphragm plate 730 is guided by means (not shown). A latch lever 731 has a head bent to a pawl 731f extending into the slot 730M, and is pivotally mounted about a pin 731j. A coil spring 731S urges it in a clockwise direction.

An armature 732 of letter "L" longitudinal cross-section has an outward bent portion 732f at the upper end thereof, and is pivotally mounted about a pin 732j. A leaf spring 732b whose one end is welded to the armature 732 abuts at the other end on a yoke 733y of a magnet 733, urging the armature 732 in a clockwise direction.

Figure 9A:
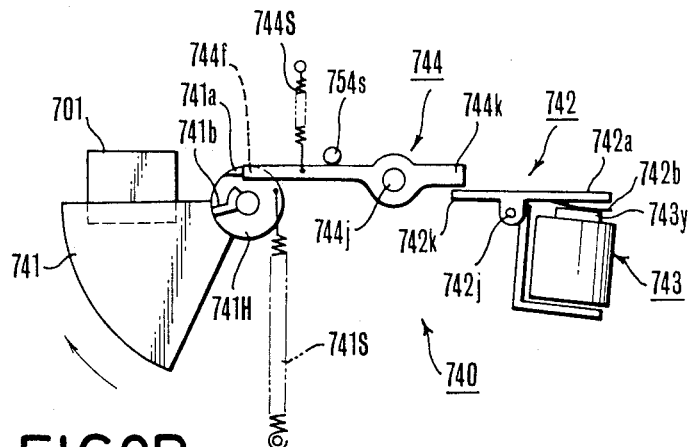
FIGS. 9A-9C are front elevational views illustrating the operation of the shutter of FIG. 7, FIG. 9A showing an initial light-metering position, FIG. 9B a closed position, and FIG. 9C an exposure position.
Figure 9B:
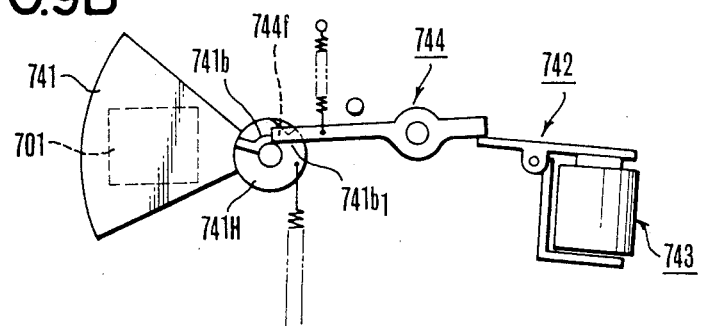
Figure 9C:
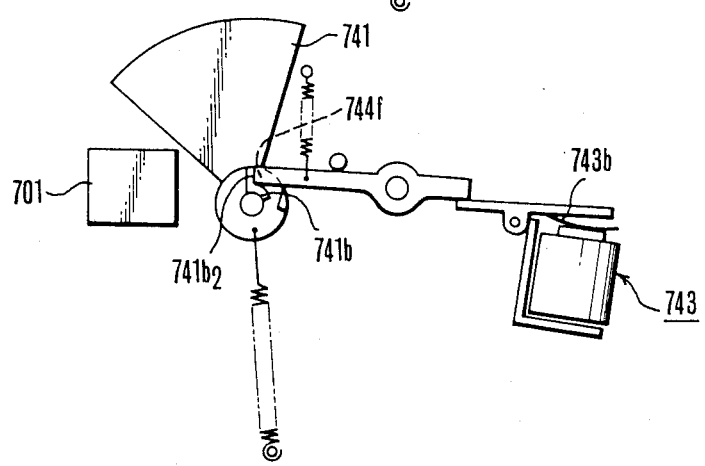

The shutter device 704 is described with additional reference to FIGS. 9A–9C, where a mechanism 740 for releasing the leading blade 741 from the latching connection and limiting the range of its movement is shown in detail. In these figures, a holder 741H for the leading blade 741 is provided with extensions 741a and 741b for defining the angular positions of the leading blade 741. A drive coil spring 741S whose one end is connected to the holder 741H urges the leading blade 741 to turn in a clockwise direction as viewed in the figures. A control lever 744 is urged by a coil spring 744S to turn about a pin 744j in a clockwise direction, and its head is formed to a pawl 744f engageable with either of the aforesaid extensions 741a and 741b. The clockwise movement of the control member 744 is limited by a stopper 744S.

An armature 742 of almost flat plate-shaped form is pivotally mounted about a pin 742j. A leaf spring 742b is welded at its one end to the armature 742, the opposite end of which abuts on a yoke 743y of a magnet 743, urging the armature 724 in a counterclockwise direction.

Another latch release and displacement control device 750 for the trailing blade 751 is almost similar in construction to that for the leading blade 741 except for exclusion of the extension 741b, and comprises a coil spring 751S, a control lever 754, another coil spring 754S, a stopper 754S, an armature 752, a magnet 753, and others (see FIG. 7).

The operation is as follows:

When a release button (not shown) is pushed down, a previous exposure is made with the aperture size of the diaphragm adjusted to a speculative setting depending on the output of a light meter (not shown).

In this embodiment, the aperture size varies in three discrete values corresponding to the three diameters of the apertures 730B–730D in the diaphragm plate 730. The aperture size to be used in the previous exposure is selected out of these three values 730B–730D.

So, the operation of the diaphragm plate 730 is explained with reference to FIG. 8.

In the operative position of FIG. 8, the pawl 731f of the latch lever 731 engages the abutment 730a of the diaphragm plate 730. In this condition, the image pickup element 701 is blocked from light. Suppose the first aperture 730B is chosen for the previous exposure. Then, one electrical pulse is given to the magnet 733. So, the magnet 733 attracts the tail 732a of the armature 732 against the bias force of the coil spring 732b, causing the armature 732 to turn in the counterclockwise direction. Then, its head 732f pushes down the tail 731k of the latch lever 731, thereby the latch lever 731 is turned in the clockwise direction against the bias force of the coil spring 731S. Therefore, the pawl 731f is disengaged from the abutment 730a as shown by dot-and-dash lines. Then, the diaphragm plate 730 is driven by the coil spring 730S to move in the direction of arrow M. Soon after the abutment 730a has moved away from the pawl 731f, the neck of the slant surface 730e abuts on the latter, as the armature 732 has so far been attracted by the magnet 733 to hinder the latch lever 731 from returning to the initial position. In other words, if such an abutting event occurs earlier than the return of the armature 732, the diaphragm plate 730 is stopped in the abutting position. Either when the attracting force of the magnet 733 later disappears, or if the aforesaid abutting event occurs later than the return of the armature 732, the slant surface 730e can push the pawl 731f down to permit further movement of the diaphragm plate 730 until the next abutment 730b abuts on the pawl 731f. Thus, the first aperture is positioned in alignment with the optical axis 702. To bring the next aperture 730D into alignment with the optical axis 702, the magnet 733 has to be given one more electrical pulse. For the maximum aperture 730D, such a procedure is repeated once more.

When such a speculative setting of the diaphragm plate 730 is completed by the diaphragm device 703, the previous exposure starts under the condition that the image pickup element 701 is partly shut off from the impinging light by the leading blade 741 of the shutter device 704. The output of the image pickup element is utilized in deriving a light value. One of the reasons why about 30% of the image sensing area from the lower side of the picture frame is blocked up from the impinging light when the main light metering is performed is that the photographic situation where a far brighter portion of the environment than the subject of principal interest comes to the lower marginal zone of the picture frame (as an inverted image of the scene is formed on the image pickup element 701 by the photographic optical system) will be encountered with a high probability, but the brightness of such an environmental portion is unnecessary to fine adjustment of the exposure. Another reason is that in the case of an image pickup element 701 having no storage area in use, that light-blocked area can be used as a storage area. Still another reason is that as the central portion of the scene to be photographed is imaged adjacent the side of that portion of the image sensing area which is exposed to the light when light metering is performed, the transferring speed of the electrical charges rises.

In such a manner, the image pickup element 701 is used to derive a light value. Based on this value, the aperture size and the shutter speed are finally determined to make a main exposure. The main exposure operation is carried out as follows:

At first, the aperture size is, if necessary, re-adjusted by moving the diaphragm plate 730 until the new one of the diaphragm apertures which has been selected by the aforesaid diaphragm device 703 is put in alignment with the optical axis 702. At the same time, the leading blade 741 of the shutter device 704 turns in the clockwise direction and stops in a position where the entire area of the image pickup element 701 is shut off from light. When the aperture size has been adjusted to the determined value, the leading blade 741 proceeds to turn in the same direction, thus initiating a main exposure of the image pickup element 701. According to the predetermined shutter speed, the trailing blade 751 also turns to follow up the leading blade 741, and, at the terminal end of movement, covers the entire area of the image pickup element 701.

The foregoing is described in more detail by reference to FIGS. 9A–9C.

In FIG. 9A, under the condition that the leading blade 741 covers about 30% of the image pickup element 701 from the lower side of the frame, the image pickup element 701 is preliminarily exposed to the light entering through the aperture of the diaphragm plate 730 as the latter has moved to the preliminarily determined position. By using this output, a light value is derived. Based on the light value, the final aperture value is determined. In a prescribed shutter time after the diaphragm plate 730 has reached the aforesaid preliminary position, the magnet 743 is energized and the yoke 743$y$ attracts the armature portion 742$a$ of the actuating lever 742, so that the actuating lever 742 is turned about the pivot pin 742$j$ in the clockwise direction, while its head 742$k$ lifts up the tail 744$k$ of the latch member 744 against the bias force of the coil spring 744S. Therefore, the latch member 744 is turned about the pivot pin 744$j$ in the counterclockwise direction and its pawl 744$f$ is disengaged from the extension 741$a$. Thereupon, the leading blade 741 is turned in the clockwise direction by the force of the coil spring 741S. As shown in FIG. 9B, when the inner end 741$b_1$ of the other extension 741$b$ on the holder 741H of the leading blade 741 abuts on the pawl 744$f$ of the latch member 744, the leading blade 741 stops. In this state, the image pickup element is reset (the signal charges are all read out from that element), thus completing the preparation for the main exposure. As the resetting is complete, when the magnet 743 is deenergized, the armature 742 and the latch member 744 return to the initial positions, where the pawl 744$f$ is disengaged from the inner end 741$b_1$. The leading blade 741 then proceeds to turn in the clockwise direction by the coil spring 741S until the side edge of the outer end portion 741$b_2$ of the extension 741$b$ abuts on the pawl 744$f$. Thus, the image pickup element is fully opened.

In such a manner, the leading blade 741 can take two angular positions in sequence as the magnet 743 turns on and off.

That is, the shutter device 704 in the initial position shuts the image pickup element 701 off to about 30% in the lower margin when the previous exposure is made to measure the light, and the aperture size and the shutter speed are determined. Then, the magnet 743 turns on to permit the leading blade 741 to turn to the position where the image pickup element 701 is entirely shut off from the light, and is reset. After that, the energization of the magnet 743 is released to start the main exposure. Subsequently, the magnet 753 of FIG. 7 is energized to release the trailing curtain from the connection with the latch member 754. The trailing blade 751 then is turned in the clockwise direction by the coil spring 751S to cover the image pickup element 701, thus terminating the main exposure.

In such a manner, the main exposure operation is performed. After that, by a charge mechanism (not shown), the diaphragm plate 730 is moved in the reverse direction to that of arrow M against the force of the coil spring 730S, and the leading and trailing blades 741 and 751 are turned in the counterclockwise direction against the forces of the coil springs 741S and 751S, until they reach the initial positions. Thus, the charging is completed.

For note, the relationship of the axial positions of the leading and trailing blades 741 and 751 is such that the closer the one of the blades which partly covers the image pickup element 701 when the previous exposure is made lies to the focal plane of the image pickup element 701, the clearer the boundary of the shadow of that blade on the element becomes, making more effective the light shielding of the image pickup element. Also, when the one of the blades which partly covers the image pickup element when the previous exposure is made is the leading one, the sequential operations to the main exposure can be carried out all by the movements of the same direction.

Next, a third embodiment which is of a simpler structure but has the same capability as described above is described by using FIGS. 10A–10C.

In this embodiment, the shutter is constructed with a single blade, while the second embodiment is of the type having two blades, namely, the leading and trailing blades 741 and 751.

Figure 10A:
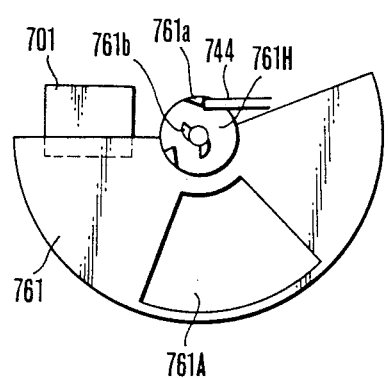
FIGS. 10A-10D illustrate another example of the shutter of FIG. 7 in the corresponding operative positions to those of FIGS. 9A-9C respectively, FIG. 10D showing another closed position after the exposure.

As shown in FIG. 10A, a blade 761 has such a shape as obtained by using three of the aforesaid leading blades 741 side by side unified to each other and, providing an aperture for main exposure in the central one. Except for projections 761$a$–761$d$ provided on a holder 761H, it is almost similar in construction to the shutter device 704 of the aforesaid second embodiment. For note, as the diaphragm device, a similar one to that of the aforesaid embodiment is used. So, its explanation is omitted here.

In FIG. 10A, the latch member 744 engages the projection 761$a$ so that about 30% of the image pickup element 701 from the lower side is shut off from light by the leading boarder of the blade 761.

Figure 10B:
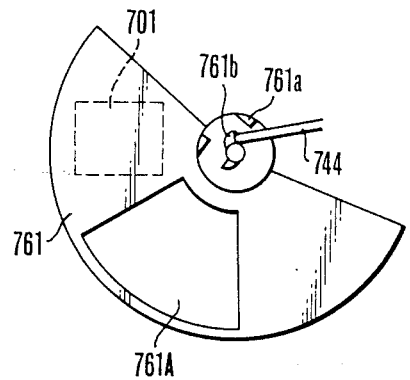
Figure 10C:
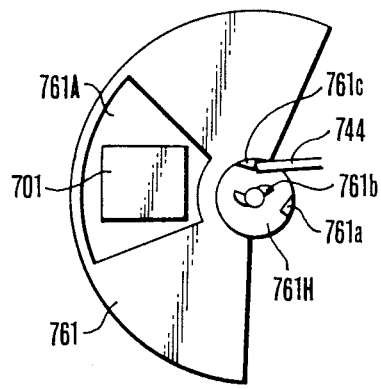
Figure 10D:
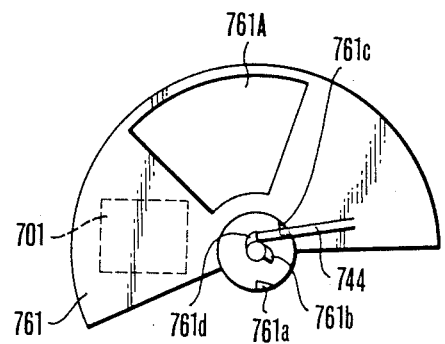

As the previous exposure is complete, when a magnet (not shown) is energized, the latch member 744 is disengaged from the projection 761$a$ to permit rotation of the blade 761 in a clockwise direction as viewed in the figure by the force of a coil spring (not shown). Then, the projection 761$b$ abuts on the latch member 744 so that the rotation stops in a position where, as shown in FIG. 10B, the image pickup element 701 is entirely shut off from light. Subsequently, the aforesaid magnet is deenergized. Then, as shown in FIG. 10C, the latch member 744 is disengaged from the projection 761b and engages the projection 761c. In this state, the image pickup element 701 is exposed through the exposure aperture 761A. In a corresponding time to the shutter speed, the aforesaid magnet is energized again. Then, as shown in FIG. 10D, the latch member 744 is disengaged from the projection 761c to permit further rotation of the blade 761. Then the latch member 744 engages the projection 761d to stop the rotation, thus terminating the main exposure.

Figure 11A:
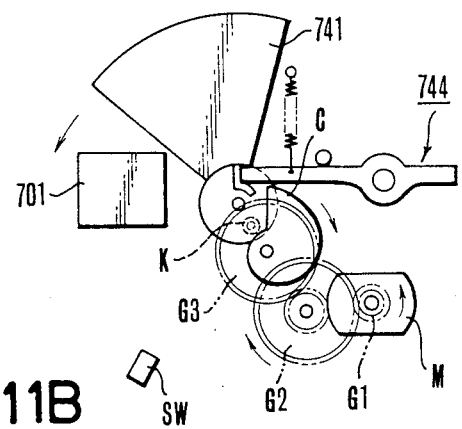
FIGS. 11A-11C are front elevational views of a charge mechanism for the shutter of FIG. 7 in different operative positions.
Figure 11B:
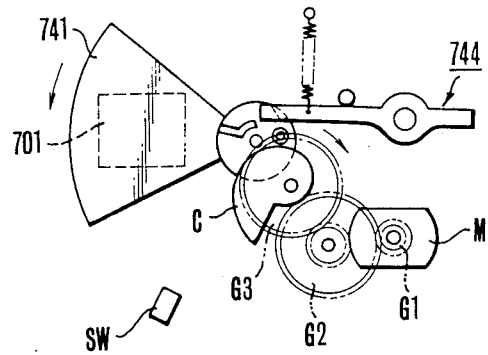
Figure 11C:
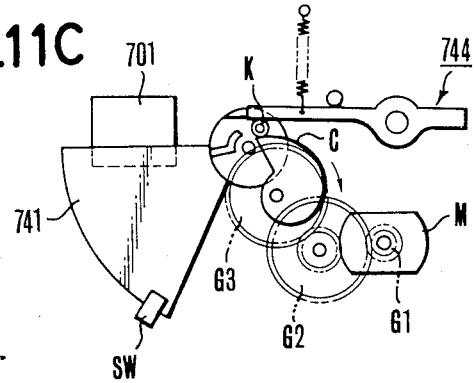

Returning now to the second embodiment, a mechanism for charging the exposure control members after the termination of the main exposure is next described by using FIGS. 11A–11C. FIGS. 11A–11C are views illustrating the main parts of the charging mechanism for the leading blade 741 of the shutter shown in the elevational views of FIGS. 9A–9C. FIG. 11A corresponds to the exposure position shown in FIG. 9C, FIG. 11B to the closed position shown in FIG. 9B, and FIG. 11C to the charged position shown in FIG. 9A.

In FIGS. 11A, 11B and 11C, M is a motor for charging; $G_1$–$G_3$ are gears for transmitting the driving power of the motor M; C is a cam connected to the gear G3. On the leading blade 741 is a roller K lifted by the cam C formed in unison with the gear G3. The gear G3 is connected through the gears G2 and G1 to the motor M. SW is a photointerrupter for detecting whether the blade is present or absent to control rotation of the motor M. In the position shown in FIG. 11A, when the motor M starts to rotate in a counterclockwise direction as viewed in the figure, the gear G3 and the cam C rotate in a clockwise direction, and the roller K is pushed upward as viewed in the figure by the cam C. Thus, the leading blade 741 starts to rotate in the counterclockwise direction. Past a position of FIG. 22B it reaches a position shown in FIG. 11C. In such a position, the roller L is charged by the cam C almost until the initial position. Then, the photointerrupter SW detects the blade and stops the current supply to the motor M. The gears G1–G3 overrun from the position of FIG. 11C by inertia, permitting the roller K to enter the valley of the cam C. That is, the cam C rotates exactly one revolution, thus terminating the charging operation. For note, at this time, the leading blade is latched by the latch member 744. Also, the trailing blade, because its having a smaller angle of rotation necessary to the exposure than that of the leading blade 741, comes to engage with the leading blade 741 in the course of charging. Therefore, it can be charged by exactly the same mechanism.

To charge the diaphragm device 703, the motor M is also used in combination with another cam which converts rotation to linear movement, so that the diaphragm plate 730 is moved in the reverse direction to that of arrow M in FIGS. 7 and 8.

Variations of the second and third embodiments are possible. For example, another blade is used for partly covering the picture frame when the previous exposure is made in addition to the leading and trailing blades, totaling three blades. Though, in the second embodiment, the displacement limiting device 740 in the shutter device 704 continues energizing the magnet 743 to hold the leading blade 741 in the closed position shown in FIG. 9B, the operation of the magnet may otherwise be controlled by giving a train of electrical pulses as in the diaphragm device 703. The number of given pulses corresponds to the amount of movement of the blade. This produces an advantage of reducing the consumption of electrical energy by the electronic imaging apparatus.

Also, in application to silver halide cameras, instead of using the the image pickup element, a photosensitive element may be used to receive the reflected light from the shutter surface or the film surface when the light value for fine adjustment of the main exposure is derived.

As has been described above, according to the invention, after the preliminary light measurement, that portion of the effective light beam which comes from the sky or other brightest portions of the environment is shut out by a portion of the shutter. Under this condition, the output of the image pickup element is used in main light metering or making the previous exposure. After that, the main exposure is made. This produces an advantage of providing a possibility of increasing the accuracy of exposure control.

Next explanation is given to the electrical circuitry of the electronic imaging apparatus of such construction as described above by reference to FIG. 12.

FIG. 12 is a block diagram of such circuitry.

In FIG. 12, the same reference characters have been employed to denote the similar parts to those shown in FIGS. 1 to 11C.

307 is an A/D converter whose output is connected to the control circuit 111. A sample-hold circuit 114 has an input connected to the output of the SPC 19 as the light metering element and has an output which is connected to the input of another A/D converter 314. A diaphragm-shutter drive circuit 300 drives the magnets 733, 743 and 753 described in FIG. 7 on the basis of the command from the control circuit 111.

The operation of the embodiment of such construction as described above is described by reference to FIG. 13.

Figure 13:
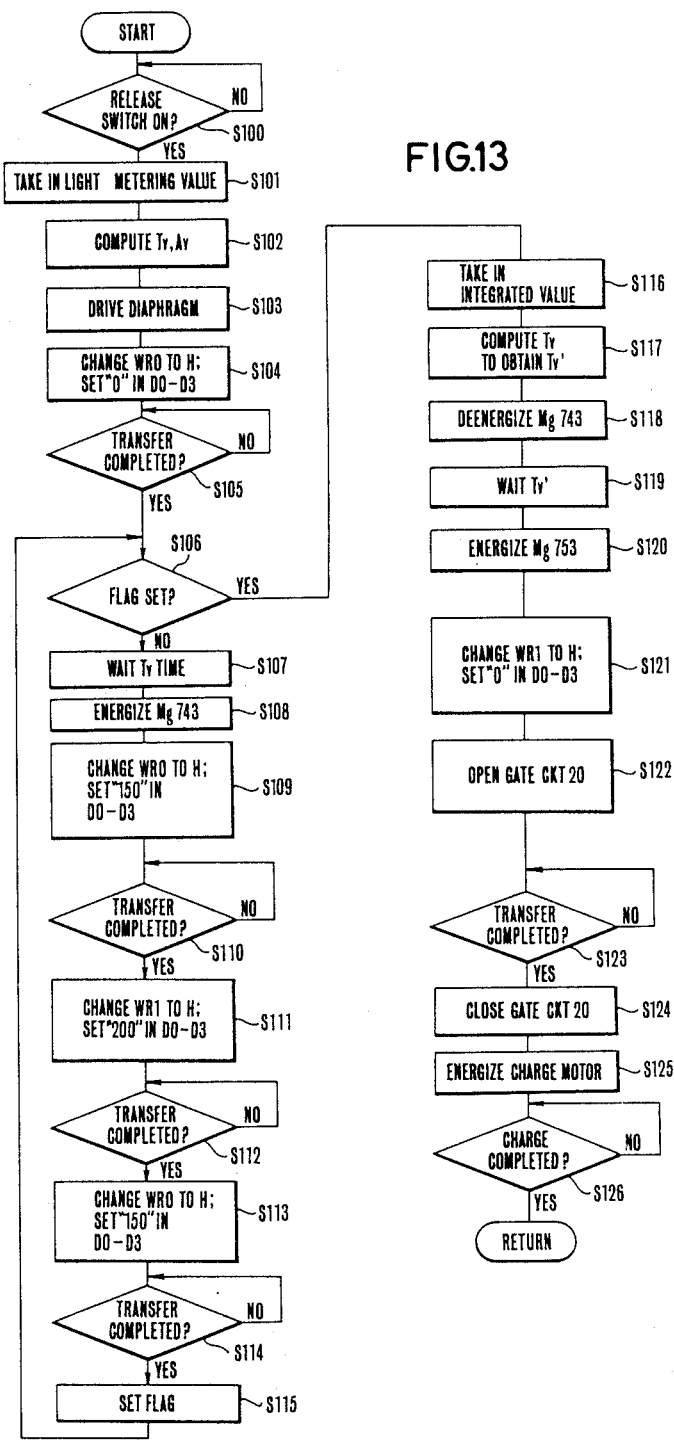
FIG. 13 is a flowchart taken to explain the operation of the control circuit 111 of FIG. 12.

FIG. 13 is a flowchart taken to explain the operation of the control circuit 111 shown in FIG. 12.

At first, whether or not a signal representing that the release switch is turned on is obtained from the release circuit 22 is tested (step S100). If it is obtained, the sample-hold circuit 114 is driven to take in the output of the light metering element or SPC 19 as the measured light value (step S101). Then, depending on the obtained light value, the TV value and AV value are computed (step S102). For note, in this embodiment, the diaphragm device 2 has three apertures 730B, 730C and 730D. As the AV value, therefore, one of the three values is selected. Then the selected AV value and the measured light value are computed to obtain a TV value. Therefore, the computed TV value is not discrete. Then, depending on the selected AV value, the magnet 733 is energized to permit movement of the diaphragm plate 730 in the direction of arrow M in FIG. 7 (step S103). Thereby, while the lower zone C of the CCD 701 is shut off from light by the leading blade 741 of the shutter as shown in FIG. 9A, the upper and central zones A and B are exposed. At the time when the driving of the diaphragm has been started, the control circuit 111 changes the control line $WR_0$ shown in FIG. 3 to high level to permit "0" to be set in the data bus D0–D3 (step S104). Therefore, "0" is loaded into the transfer pulse counter 100, and the RS-FF 104 is set. Responsive to this, the clear transfer pulse generating circuit 101 produces pulses such as φv described above, and the CCD 701 is cleared. The transfer pulse counter 100 counts the aforesaid pulses $\phi v$. When the counted number of the pulse $\phi v$ has reached "250", that is, when all photo-signals accumulated on the image sensing area 200 have been transferred, the carry signal 122 is produced. Based on such a carry signal 122, the control circuit 111 determines whether or not the transferring has been completed (step 105).

Then, whether or not a flag to be described later is set is tested (step S106). If not so, then wait a time equal to the aforesaid computed shutter time in the step S102 (step S107).

For note in connection with the step S103 for driving the diaphragm, even though the energization of the magnet 733 is started, because the mechanical power transmission including, for example, the armature 732 and the latch lever 731, has a response delay, there is a time lag until the diaphragm actually opens. But, the clearing of the electrical charges accumulated in all the picture elements of the CCD 701 which is carried out in the steps S104 and S105 is completed in a very short time. Hence, the actual opening of the diaphragm or the initiation of the exposure of the CCD 701 occurs after the CCD 701 has already been cleared of the electrical charge in every picture element.

After the computed TV time in waiting has passed in the step S107, the magnet 743 shown in FIGS. 7 to 9C is energized (step S108). Thereby, the shutter device 704 transits from the state shown in FIG. 9A to the state shown in FIG. 9B.

In sequence to the energization of the magnet 743, the control circuit 111 changes the output at the terminal WR$_0$ to high level to permit setting of "150" in the data bus D0–D3 (step S109).

Therefore, the signal of high level is applied to the input terminal S of the RS-FF 104, and the data of "150" from the data bus D0–D3 is loaded into the transfer pulse counter 100.

Responsive to setting of the RS-FF 104 at the next clock pulse, the clear transfer pulse generating circuit 101 starts to operate, producing the aforesaid pulses such as $\phi v$. During this time, the vertical transferring is carried out at a faster speed than usual. When the number of produced pulses $\phi v$ has reached "100", the counted number of the transfer pulse counter 100 becomes "250". Therefore, that counter 100 produces the carry signal.

Responsive to this carry signal, the RS-FFs 104 and 105 reset themselves. Therefore, production of transfer pulses is stopped for a while. Then, as the control circuit 111 takes such a carry signal as the end of the transferring, the flow advances from the step S110 to a step S111. At this time, the electrical charges of the zone B shown in FIG. 4 are transferred to the zone C.

For note in connection with the step S108, even when to drive the shutter, similarly to the driving of the diaphragm, because of the presence of the response delay in the mechanical power transmission, there is a time lag of certain duration from the actuation to the actual movement of the shutter from the position of FIG. 9A to the position of FIG. 9B. But, since, by executing the steps S109 and S110, the electrical charges of the image sensing area are transferred at a very high speed, the charges of the zone B shown in FIG. 4 are transferred to that zone C which has been shut off from light by the shutter from the beginning within such a time lag, and, therefore, not influenced by the foreign light. Thus, the photo-signals are prevented from deteriorating.

Also, the time interval from the moment at which the electrical charges to be integrated by the integration circuit 6 have started to generate, or the image sensing area of the CCD 701 has been cleared to the moment at which they start to be transferred from the zone B to the zone C in the steps S109 and S110 does not depend on the response delay of the mechanical power transmission of the shutter device, but only on the timing of the control signal given to the clock generating circuit 35 from the control circuit 111. In this embodiment, therefore, the preliminary exposure can be very accurately controlled.

Then, the control circuit 111 changes the control line WR$_1$ to high level to permit setting of "200" in the data bus D0–D3 (step S111).

Therefore, the signal of high level is applied to the input terminal S of the RS-FF 105, and the data of "200" from the data bus D0–D3 is loaded into the transfer pulse counter 100.

Responsive to setting of the RS-FF 105 at the next clock signal, the readout pulse generating circuit 102 starts to operate, producing the aforesaid pulses such as $\phi v$. Since the pulses produced from the readout pulse generating circuit 102 are the normal ones, the signals of the image sensing area 200 are read out from the horizontal shift registers 201–203. The read-out signals are integrated by the integration circuit 6 shown in FIG. 12 in a manner as described above. The output of the integration circuit 6 is treated in a step S116.

For note, since, in this case, 100 lines of the video signals are abandoned to the drain 220 in the steps S109 and S110, those 50 lines of the video signals which correspond to the central zone of the picture frame are used in such integration.

Hence, as has been described above, the photo-signals representing the brightness of the sky or like portion of the environment of which the image is cast to the lower zone C of the CCD 701 are ignored when the aforesaid integration is carried out.

When the 50th pulse $\phi v$ is produced, the content of the transfer pulse counter 100 becomes "250", and the carry signal is produced therefrom. As the detection of such a carry signal implies that the reading operation has terminated, the flow advances from the step S112 to a step S113.

The step S113 and a step S114 are similar to the steps S109 and S110. So their explanation is omitted here.

In such a manner, the transferring of the charges from the image sensing area 200 is operated. When this operation is completed, the flag is set in a step S115, and the flow returns to the step S106. It then branches from the step S106 to a step S116.

Then, the output of the integration circuit 6 in the digital form at the output of the A/D converter 307 shown in FIG. 12 is taken (step S116). From this output, the preliminary TV value is corrected so that the integrated value becomes a prescribed value. Thus, a new TV value TV' as the exposure value is obtained (Step S117). Subsequently, the energization of the magnet 743 is released (step S118). Therefore, the shutter is moved from the position of FIG. 9B to the position of FIG. 9C.

Then, after the actual shutter time TV' has expired (step S119), the magnet 753 is energized (step S120) to permit the trailing blade 751 to run down to the position where the CCD 701 is entirely shut off from light.

In a step S121, the output at the terminal WR1 is changed to high level and "0" is set in the data bus D$_0$–D$_3$. Then, similarly to what has been described in connection with the step S111, the readout pulse generating circuit 102 starts to operate. Hence, reading-out of the image sensing area 200 is started and carried out in an usual way, and the gate circuit 20 is opened in a step S122. The recording circuit 21 then records the video signal for one frame.

When the termination of the transferring operation is detected, or the operation of recording the video signals for one frame has terminated, the flow advances from the step S123 to a step S124 where the gate circuit 20 is closed. The charge motor then is energized (step S125). The switch SW shown in FIGS. 11A–11C is changed over to terminate the operation of charging the shutter and diaphragm devices (step S126). Thus, the sequence of operations comes to end, and the flow returns to the step S100.

As has been described above, according to the invention, the apparatus is provided with shuttering means arranged to rest in a position where the image receiving surface of the image pickup element is covered only in part. The use of that output of the image pickup element which is obtained under such a condition provides a possibility of preventing the accuracy of exposure control from being affected by a particular portion of the environment which has an extraordinarily high brightness level, for example, the cloudless sky with the sun shining.

What is claimed is:

1. An electronic imaging apparatus comprising:
   (a) image pickup means having a light receiving area for sensing an object image and capable of converting the object image to an image signal;
   (b) control means for selectively blocking from light a first portion of the light receiving area of said image pickup means which senses the upper part of said object image under which condition the image signal is formed in a second portion of the light receiving area which is not blocked from light; and
   (c) integrating means for integrating said image signal.

2. The apparatus according to claim 1, wherein send light receiving area consists of picture elements arranged in matrix-like relation.

3. An apparatus according to claim 1, wherein said control means has a store mode in which after an image signal has been formed in said second portion of the light receiving area, this image signal is transferred to and stored in said first portion of the light receiving area.

4. An apparatus according to claim 3, wherein said control means has a readout mode in which the image signal once stored in the first portion of the light receiving area is read out.

5. An apparatus according to claim 4, wherein the period of transferring the image signal from the second portion to the first portion of the light receiving area is shorter than the reading-out period.

6. An apparatus according to claim 1, wherein said control means further includes a mode in which the light receiving area is entirely blocked from light, and another mode in which the light receiving area is entirely unblocked with respect to said object image.

7. A light measuring device comprising:
   (a) a photosensitive element for detecting the brightness of an object to be photographed;
   (b) image pickup means provided in separation from said photosensitive element to convert an entered image into an image signal;
   (c) adjusting means responsive to the output of said photosensitive element for adjusting the amount of image signal in said image pickup means to an appropriate level;
   (d) control means having a light metering mode in which a first portion of the image signal in said image pickup means whose level has been approximately adjusted by said adjusting means is read out at a relatively high speed which is faster than that for a second portion and is abandoned, and the second portion is read out at a relatively slow speed to perform measurement of light with a high accuracy; and
   (e) shuttering means for selectively blocking a portion of said image pickup means from said object in said light metering mode.

8. A device according to claim 7, wherein said adjusting means performs another adjusting operation by using the result of the aforesaid light measurement so that the level of the image signal in said image pickup means becomes more appropriate.

9. A device according to claim 7 or 8, wherein said adjusting means includes means for controlling an exposure.

10. A device according to claim 9, wherein said adjusting means includes a diaphragm or a shutter.

11. A device according to claim 7, further comprising means for selecting said second portion.

12. A device according to claim 8, wherein said control means has a readout mode in which the image signal formed under the condition that another adjusting operation has been carried out by said adjusting means is read out, and further comprising recording means for recording the image signal read out in the readout mode.

13. A device according to claim 7, wherein said shuttering means is arranged to prevent that portion of a light beam which corresponds to the upper margin of said entered image from impinging on said image pickup means.

14. An electronic imaging apparatus comprising:
   an image pickup element;
   shuttering means having a first stopped position in which the light receiving surface of said image pickup element is entirely blocked from light, and a second stopped position in which only a portion of said light receiving surface is blocked from light; and
   light metering means arranged to integrate image signals formed in the image pickup element in said second stopped position, thereby providing a light metering information signal.

15. An electronic imaging apparatus comprising:
   an image pickup element;
   shuttering means having a first state in which a predetermined portion of the light receiving surface of said image pickup element is blocked from light, and a second state in which it is entirely blocked from light;
   control means for transferring the signal generated in the the remainder of said light receiving surface of said image pickup element when in said first state to said predetermined portion of said image pickup element; and
   said control means being arranged to control the timing of transferring responsive to the intensity of an object image.

16. An apparatus according to claim 15, wherein said image pickup element is a CCD.

17. An electronic imaging apparatus for controlling an exposure by using an output of an image pickup element and an output of a photosensitive element used for light measurement, wherein control means is provided for differentiating the speed at which a prescribed portion of the image sensing area of said imaging pickup element to be used for exposure control is read out from the speed at which another portion is read out, said imaging apparatus further including blocking means for selectively blocking from light at least a portion of the surface of the image pickup element except for a predetermined portion.

18. An apparatus according to claim 17, wherein the size of the prescribed portion to be used for exposure control is made changeable by adjusting means accessible from outside of said apparatus.

19. A driving device for an image pickup element comprising readout means for reading out signals from said image pickup element, a first means for changing the reading-out speed of said readout means over between a prescribed portion of said image pickup element and a portion other than said prescribed portion, and second means for changing the size and location of said prescribed portion by commands from outside of said device, said driving device further including blocking means for selectively blocking from light at least a portion of the surface of the image pickup element except for a predetermined portion.

* * * * *

UNITED STATES PATENT AND TRADEMARK OFFICE
CERTIFICATE OF CORRECTION

PATENT NO. : 4,972,269

DATED : November 20, 1990

INVENTOR(S) : Nobuo Fukushima, et al.

It is certified that error appears in the above-identified patent and that said Letters Patent is hereby corrected as shown below:

Col. 1, line 31.  After "arose" insert -- in --

Col. 1, line 32.  Delete "in"

Col. 1, line 44.  Change "when in" to -- in the --

Col. 1, line 46.  Delete "amount"

Col. 6, line 68.  Change "VV" to -- $\emptyset$V --

Col. 8, line 29.  Delete "," after "counter"

Col. 12, line 30.  Delete "the" first occurrence

Col. 12, line 36.  Delete "the" first occurrence

Col. 13, line 38.  Change "22B" to -- 11B --

Col. 13, line 49.  After "cause" insert -- of --

Col. 14, line 7.  Delete "the" first occurrence

Col. 14, line 40.  Change "taken" to -- used --

Col. 14, line 63.  Change "WRo" to -- WRO --

Col. 15, line 33.  Change "WRo" to -- WRO --

Col. 15, line 56.  Change "to drive" to -- driving --

Col. 16, line 14.  Change "$WR_1$" to -- $WR1$ --

Col. 16, line 68.  Change "$D_0-D_3$" to -- DO - D3 --

Col. 17, line 4.  Change "an" to -- a --

Col. 17, line 41.  Change "The" to -- An -- and "send" to -- said --

Col. 18, lines 7-8.  Change "approximately" -- appropriately --

UNITED STATES PATENT AND TRADEMARK OFFICE
CERTIFICATE OF CORRECTION

PATENT NO. : 4,972,269

DATED : November 20, 1990

INVENTOR(S) : Nobuo Fukushima, et al.

It is certified that error appears in the above-identified patent and that said Letters Patent is hereby corrected as shown below:

Column 18, line 52, change "stopped position" to --state--.

Signed and Sealed this

Seventh Day of July, 1992

Attest:

DOUGLAS B. COMER

*Attesting Officer*     *Acting Commissioner of Patents and Trademarks*